US011826595B1

(12) United States Patent
Conley

(10) Patent No.: US 11,826,595 B1
(45) Date of Patent: Nov. 28, 2023

(54) FLAMMABLE FIREFIGHTER TRAINING GEAR

(71) Applicant: Ryan Conley, Davie, FL (US)

(72) Inventor: Ryan Conley, Davie, FL (US)

( * ) Notice: Subject to any disclaimer, the term of this patent is extended or adjusted under 35 U.S.C. 154(b) by 0 days.

(21) Appl. No.: 18/331,212

(22) Filed: Jun. 8, 2023

(51) Int. Cl.
*G09B 19/00* (2006.01)
*A62C 99/00* (2010.01)

(52) U.S. Cl.
CPC ................................ *A62C 99/0081* (2013.01)

(58) Field of Classification Search
CPC .... G09B 19/00; G09B 19/003; A63B 21/065; A63B 21/4001; A63B 21/4007; A63B 21/4011
USPC .......................................................... 434/226
See application file for complete search history.

(56) References Cited

U.S. PATENT DOCUMENTS 5,144,694 A * 9/1992 Conrad Da oud ... A63B 21/065 D2/737
5,659,898 A * 8/1997 Bell, Jr. ............. A63B 21/4025 2/69
5,768,706 A * 6/1998 Griffith ................ A63B 21/065 2/102
5,951,446 A * 9/1999 Monforte ............. A63B 21/065 2/456
7,870,623 B2 * 1/2011 Judd .................. A63B 21/4007 5/655.4
8,273,001 B2 * 9/2012 Karecki ............. A63B 21/4001 2/22
9,301,554 B2 * 4/2016 Whaley .................... A41D 1/00
10,661,048 B1 * 5/2020 Hill ......................... G06F 3/011
11,117,012 B2 * 9/2021 Petrakis ............... A41D 31/125
2002/0010058 A1 * 1/2002 Myrick ................ A63B 21/065 482/92
2002/0152534 A1 * 10/2002 Morrison ............. A63B 21/065 2/102
2003/0208832 A1 * 11/2003 VandenBerg ........ A63B 21/065 2/102
2007/0256206 A1 * 11/2007 Nilsen .................. A63B 21/065 2/69

(Continued)

OTHER PUBLICATIONS

"Weightvest.com: Satisfied Firefighters, Military and Teams", May 28, 2022 [retrieved online Jul. 11, 2023]. (Year: 2022).*

(Continued)

*Primary Examiner* — Kurt Fernstrom
(74) *Attorney, Agent, or Firm* — Larson & Larson; Justin P. Miller; Frank Liebenow

(57) ABSTRACT

Flammable untreated firefighter training gear is Structural Firefighting Gear (SFG) manufactured without the use of chemical treatments that create resistance to flammability. Stated differently, the gear is SFG that is flammable in the sense that the resulting clothing is as flammable as the uncoated fabric from which the SFG is manufactured. The majority of a firefighter's day is spent preparing for responses to an incident, rather than actual incident response. In other words, the most significant period of time that a firefighter spends wearing their SFG is not during a dangerous incident response scenario, but rather while taking part in the extensive training and preparation to ensure both mental and physical readiness for incidents. As a result, firefighters are often wearing their SFG when its fire and chemical resistance treatments are unnecessary.

13 Claims, 5 Drawing Sheets

(56) References Cited

U.S. PATENT DOCUMENTS

| | | | | |
|---|---|---|---|---|
| 2008/0280737 | A1* | 11/2008 | Cook | A63B 21/065 482/105 |
| 2010/0319099 | A1* | 12/2010 | Washington, Sr. | A63B 21/065 2/69 |
| 2011/0091861 | A1* | 4/2011 | Eastman | G09B 19/003 434/433 |
| 2011/0247127 | A1* | 10/2011 | Pou | A41D 13/0012 2/338 |
| 2013/0298301 | A1* | 11/2013 | Petrakis | A63B 21/065 2/69 |
| 2014/0302970 | A1* | 10/2014 | Sinclair | A63B 21/0601 482/105 |
| 2022/0362615 | A1* | 11/2022 | Levinsohn | A63B 21/0603 |

OTHER PUBLICATIONS

"FirefighterNation: Working Out With a Weight Vest", Oct. 18, 2012 [retrieved online Jul. 11, 2023]. (Year: 2012).*

"Simulaids 50 Lb Weighted Training Vest IAFF", Aug. 12, 2022 [retrieved online Jul. 11, 2023]. (Year: 2022).*

* cited by examiner

FLAMMABLE FIREFIGHTER TRAINING GEAR

FIELD

This invention relates to the field of firefighter training equipment and more particularly to firefighter clothing for use in training.

BACKGROUND

Structural fire gear (SFG), also referred to as bunker gear or turnout gear, is a multilayered garment designed to protect firefighters during dangerous and extreme conditions. Such conditions can vary from a structure fire to the removal of injured persons from inside a damaged vehicle.

As a result, the SFG includes many features for protection of the user. Some features are related to the construction of the clothing, including its multiple layers and fabrics. Other features are associated with chemical treatments applied to the fabrics both before and after the assembly of the constituent parts into the SFG.

Structurally, the outermost layer of the SFG provides resistance to heat, water, and oil, while creating a shape to support inner layers. The inside of the outermost layer includes a moisture barrier commonly manufactured with fluoropolymer polytetrafluoroethylene (PTFE) for water resistance.

The liner layer, the layer against the user skin, is the thermal layer. This layer removes moisture from the user's skin while providing additional thermal protection.

While the associated fabrics can be treated after assembly, they are commonly treated before assembly. In other words, the fabrics are purchased pre-treated.

The result of this treatment, in combination with chemicals and firefighters is exposed to during incidents, is significant chemical exposure to the firefighter and increased cancer risk. What is needed is equipment the firefighters can use for the majority of their day that does not create cancer risks.

SUMMARY

Flammable firefighter training gear is SFG manufactured without the use of chemical treatments that create resistance to flammability. Stated differently, the gear is SFG that is flammable in the sense that the resulting clothing is as flammable as the uncoated fabric from which the SFG is manufactured.

Firefighters wear their SFG for both training and incident response. Training can include activities such as mock scenario responses, or physical fitness training such as circuit training, weightlifting, and so forth.

The majority of a firefighter's day is spent preparing for responses to an incident, rather than actual incident response. In other words, the most significant period of time that a firefighter spends wearing their SFG is not during a dangerous incident response scenario, but rather while taking part in the extensive training and preparation to ensure both mental and physical readiness for incidents. As a result, firefighters are often wearing their SFG when its fire and chemical resistance treatments are unnecessary.

This disparity between the time spent in practice and incident response is even more significant during the extensive training required of a firefighter prior to employment. In such training, or school, rarely are firefighting students exposed to fire or dangerous chemicals. Instead, the students are working through simulations of rescue scenarios without the presence of dangerous chemicals or fire.

For example, in Florida, 492 hours of training are required before testing for the Florida fire certificate. The majority of this time is spent practicing skills outside of the fire grounds. The training includes a total of 7 hours of hazardous liquids and high temperature exposure. The result is hundreds of hours of unnecessary chemical exposure due to wearing chemically treated fabrics and compounding chemical exposures from the usage of SFG in dangerous environments resulting in increased carcinogenic exposure.

Again, the chemical and flammability resistant characteristics of the chemicals applied to the SFG are unnecessary in such scenarios. Thus, the chemically treated SFG is being worn too frequently and unnecessarily.

There are two critical issues associated with overuse of chemically treated SFG.

The first issue is exposing the firefighter to chemicals used within the pre-treated fabrics of the SFG, as well as exposure of the firefighter to chemicals picked up by the SFG during incident response.

The second issue is that cleaning the SFG results in degradation. Laundering reduces the useful life of the SFG and affects its ability to protect the firefighter from fire, chemicals, and sharp objects.

Regarding the first issue, there are multiple harmful chemicals associated with treated SFG. Chemicals include those applied to the fabrics used to fabricate treated SFG to create flammability resistance. Additionally, hazardous chemicals include those chemicals that are deposited on the treated SFG during response to incidents. A partial list of chemicals includes:

- Poly-hydrocarbon materials—flame retardants applied to fabrics to reduce their flammability.
- Polycyclic Aromatic Hydrocarbons (PAH)—PAHs exist in oil, gasoline, and wood which firefighters are exposed to when responding to automotive and structural fire incidents.
- Per- and Polyfluoroalkyl Substances (PFAs) or Flame Retardants—PFAs are a group of chemicals used to create resistance to heat, oil, stains, grease, and water.
- DHEPs—a chemical added to plastics for flexibility is found in bunker gear both used and unused and is believed to cause reproductive health and endocrine system problems.

Exposure to these chemicals is damaging to firefighters' health. As a result of this exposure, it is predicted that 74% of firefighter deaths are caused by cancer.

Regarding the second issue, in an effort to reduce the hazardous chemical contamination of their SFG, firefighters clean, or decontaminate, their SFG after every fire incident. It is also common practice for firefighters to clean their SFG after training sessions to remove sweat and other odors.

The primary problem with decontamination is that it is largely ineffective at removing the hazardous chemicals present within the fabrics.

The secondary problem with decontamination is that laundering firefighting gear reduces its structural performance and integrity. Degradation includes a decrease in tear strength. Laundering also decreases the ability of the SFG to allow the firefighter's generated body heat to pass through, increasing the chance that the firefighter will overheat during practice or during an incident response.

Despite the hazards associated with practicing using treated SFG, it is important that firefighters become used to the bulk, weight, and reduced movement ability associated with the use of SFG due to the increased overall fatigue and strain, elevated heart rate, reduced range of motion at joint angles, and reduced functional balance. For these reasons it is vital to recreate the effects of SFG in training.

The use of non-treated SFG, so long as the non-treated SFG maintains the same bulk, weight, and reduced movement ability associated with treated SFG, would allow the firefighter to benefit from becoming accustomed to the use of their equipment without creating the associated hazardous from compounding chemical exposures both from treated fabric and operating in carcinogenic environments.

Such non-treated SFG could be used during many of the tasks firefighters practice, including putting on and removing SFG, search and rescue, firehouse training, establishing a water supply, throwing ladders, forcible entry, survival training, aerial operations, fire pump operation, and any full-gear physical fitness activities such as team or individual circuit training. The SFG could even be used for public-facing events, such as school tours or open houses.

The non-treated SFG requires particular components to ensure that it acts as a convincing replica of treated SFG. Such components include a jacket, jacket lining, pants, and a pants lining.

The non-treated SFG would be constructed without treated fabrics that resist fire.

Instead, the preferred outer layer is a heavy canvas, for example, a 10-ounce cotton ripstop canvas. Ripstop fabrics are crafted with double warp and weft threads woven into a crosshatch pattern to create a resistance to tearing and ripping. The 10-oz measurement refers to the weight of one square yard of fabric.

The preferred inner layer is formed from a combination of materials commonly seen in moving blankets, moving blankets being the padding used to wrap furniture when packed in a truck or other container. Typical construction is a non-woven polyester fabric covering a cotton filler. The layers are often quilted, or sewn across and through using a pattern, to ensure the cotton filler remains evenly distributed between the polyester outer layers.

Finally, ballistic nylon is used for abrasion resistance, such as at the elbows, knees, and cuffs. The preferred material is 19-ounce nylon.

Usage of these materials will reduce chronic carcinogenic exposures due to chemical free materials and further protection for the firefighter by this gear never being used or exposed to chemicals from incidence or live fire training in the first place.

The use of chemical treatments in SFG is important when firefighters are responding to situations where hazardous chemicals and high temperatures are present. But overexposing firefighters to dangerous chemicals, when such exposure is unnecessary, is an avoidable error.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
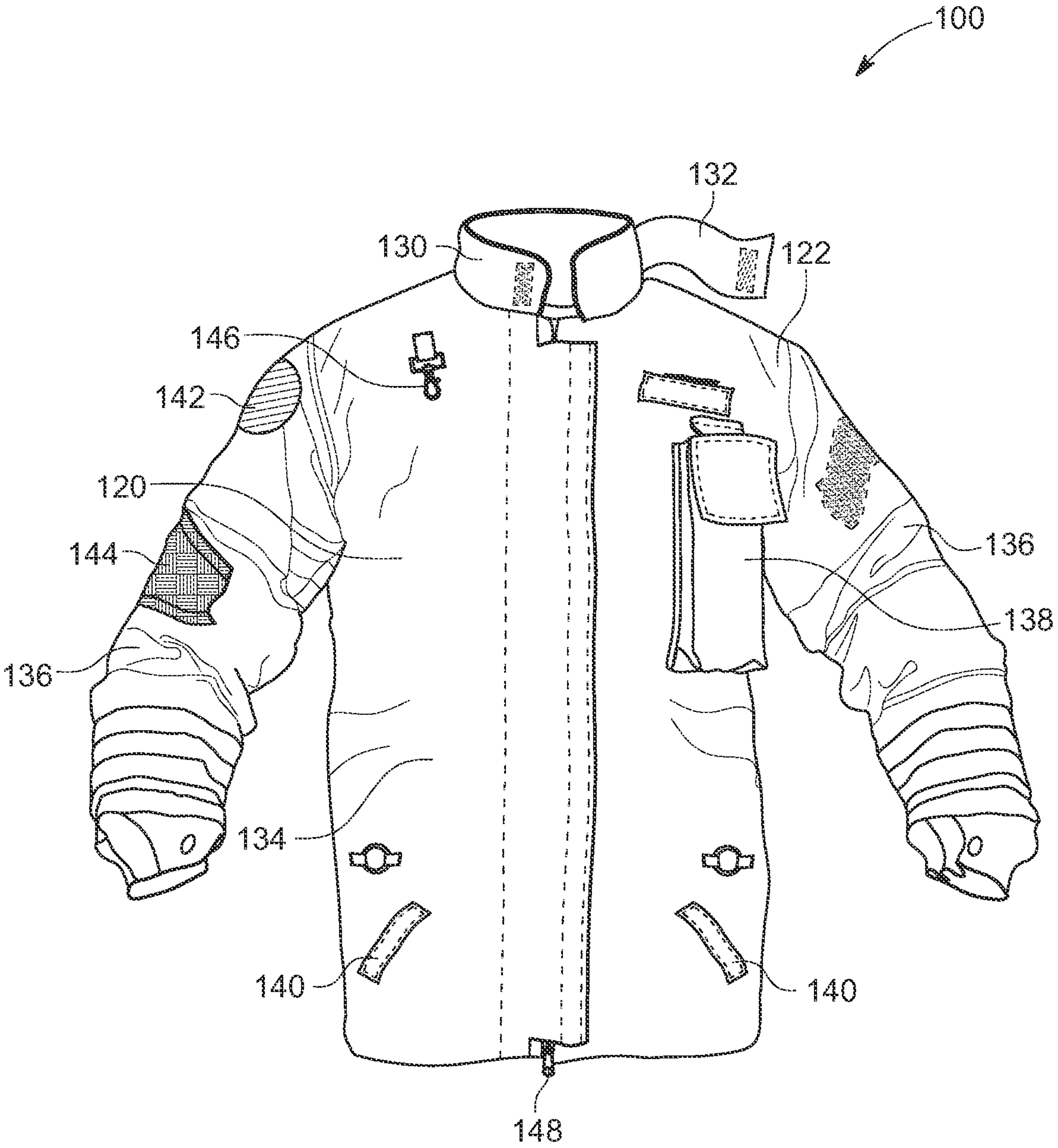
FIG. 1 illustrates a view of the jacket outer layer of the non-treated structural firefighting gear.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a view of the jacket outer layer of the non-treated structural firefighting gear is shown.

Figure 3:
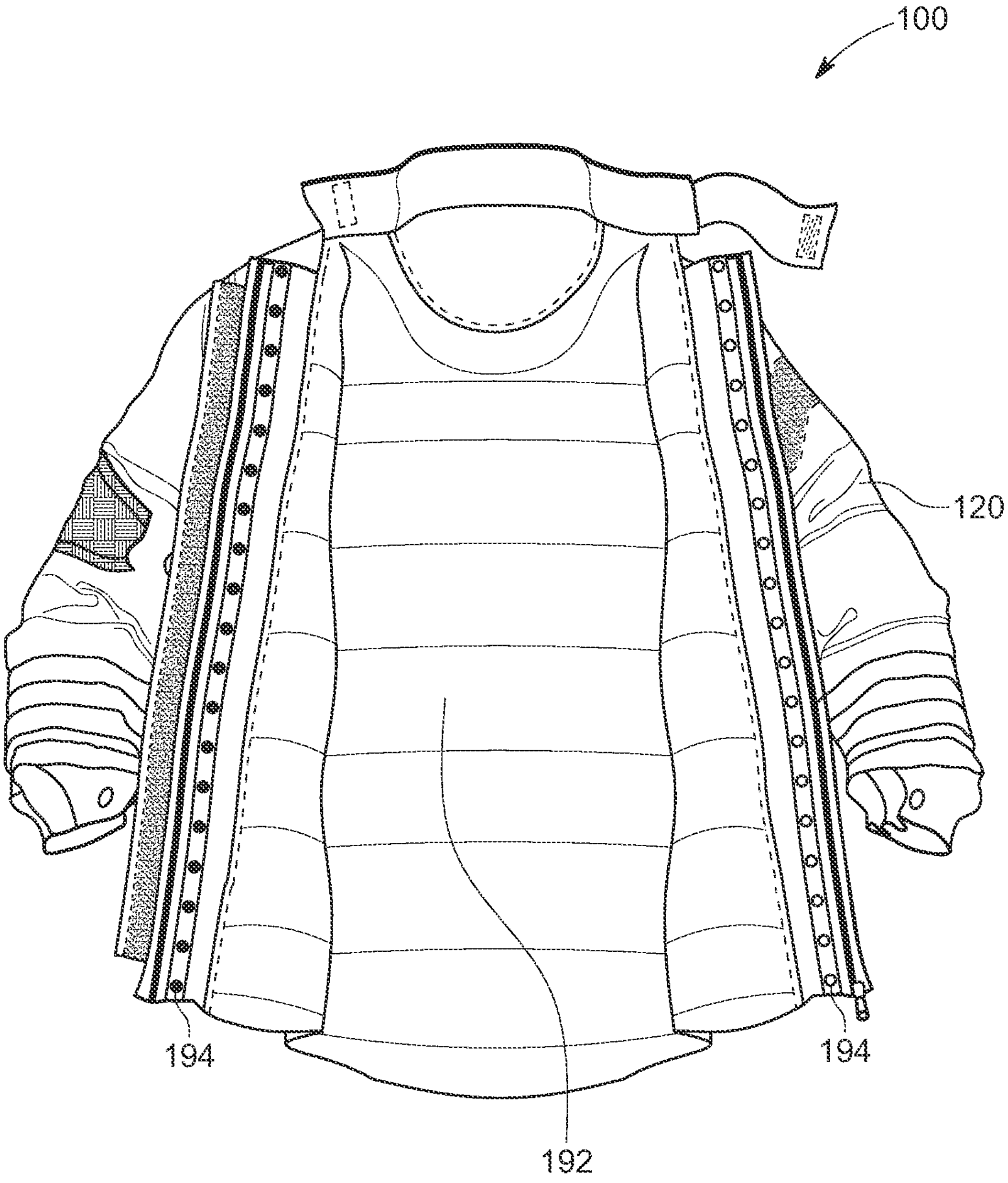
FIG. 3 illustrates a view of the jacket lining of the non-treated structural firefighting gear.

The non-flame-resistant structural firefighting gear 100 includes a jacket 120 formed from a jacket outer layer 122 and a jacket liner 192 (see FIG. 3).

The jacket 120 is formed from a collar 130 with collar wrap 132.

The body 134 center of the jacket 120, with two sleeves 136.

The body 134 includes optional radio pocket 138, hand pockets 140, shoulder patch 142, elbow patch 144, and flashlight clip 146.

The jacket is preferably opened and closed via zipper 148.

Figure 2:
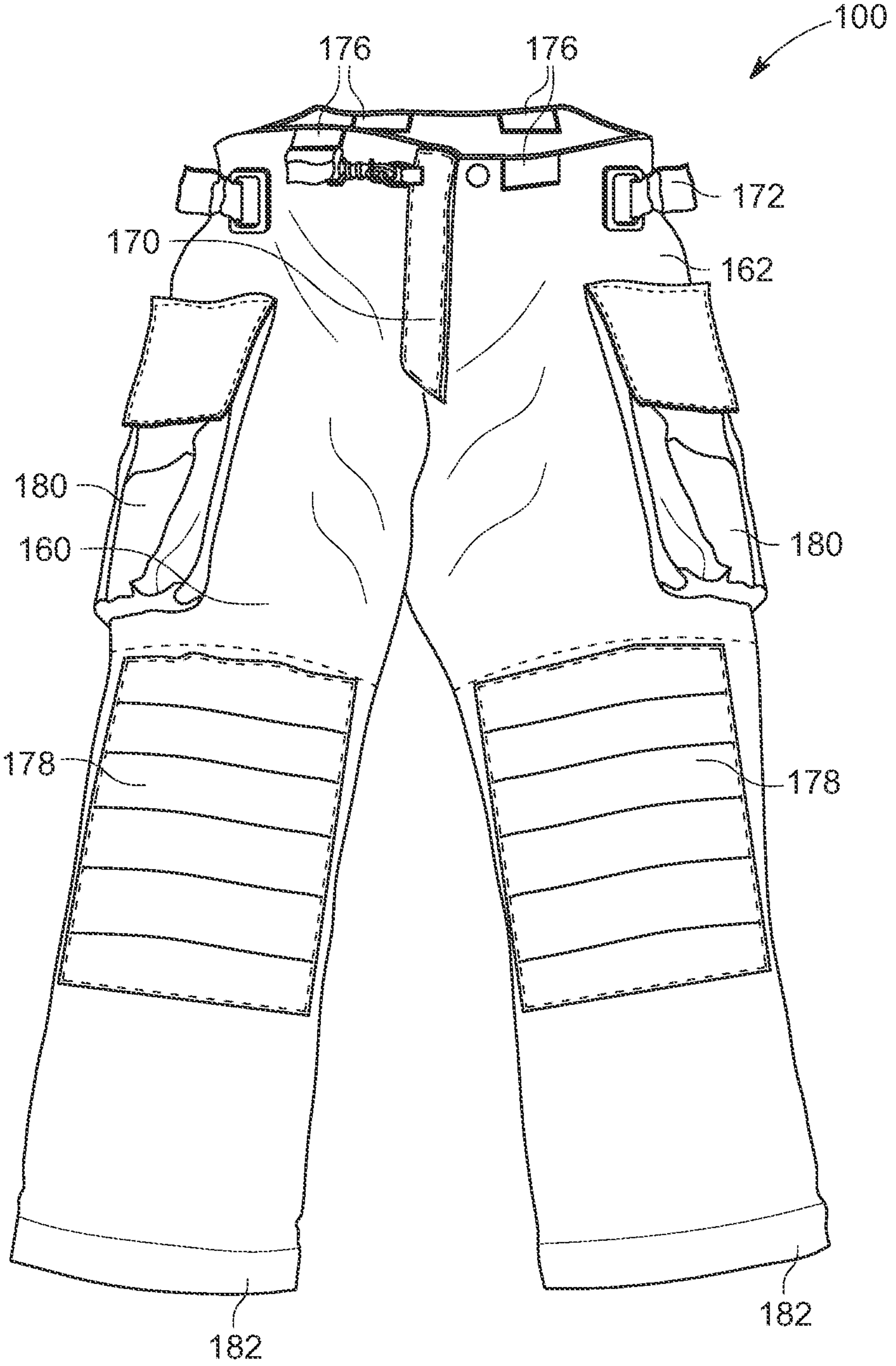
FIG. 2 illustrates a view of the pants outer layer of the non-treated structural firefighting gear.

Referring to FIG. 2, a view of the pants outer layer of the non-treated structural firefighting gear is shown.

Figure 4:
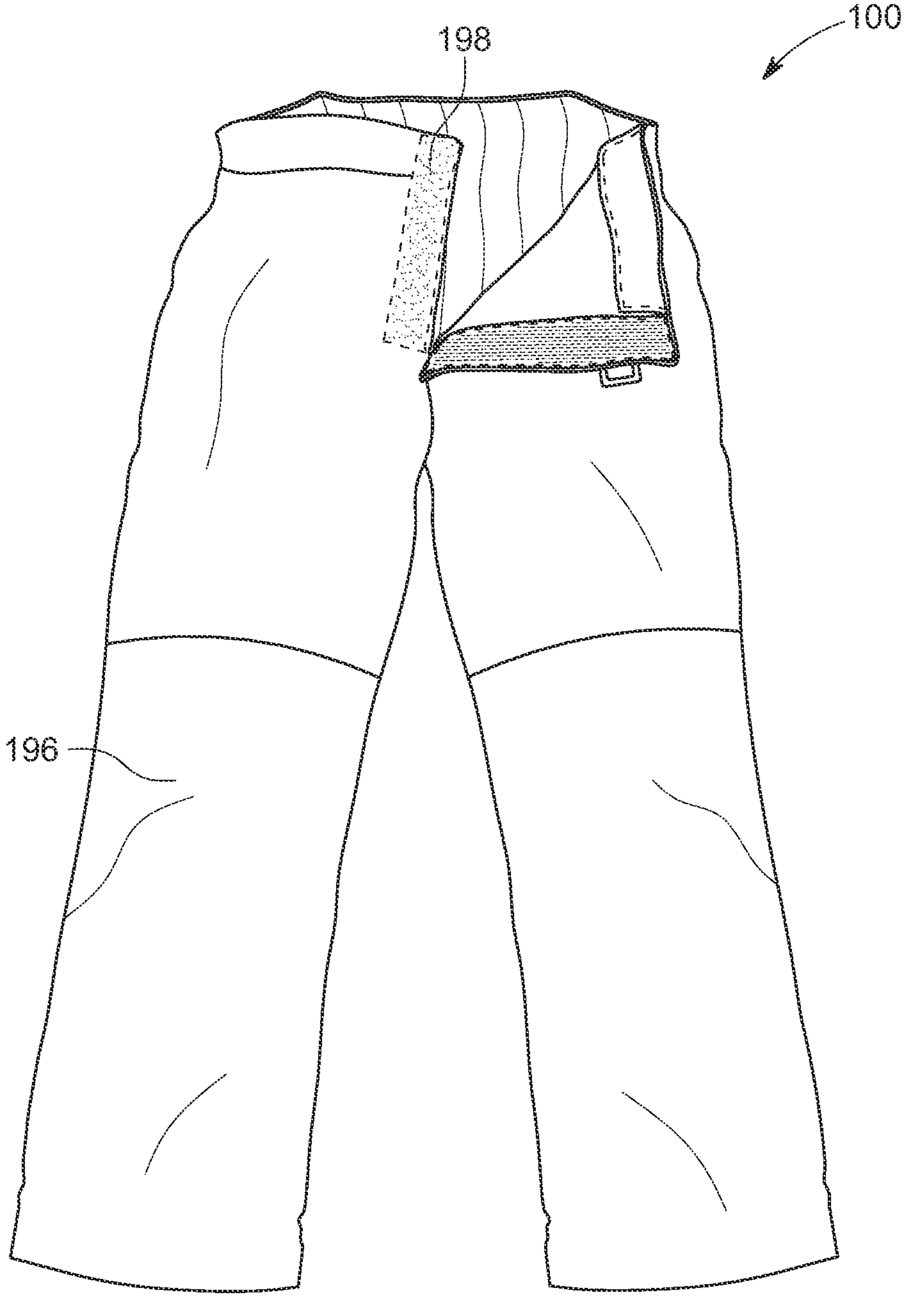
FIG. 4 illustrates a view of the pant lining of the non-treated structural firefighting gear.

The pants 160 are formed from a pant outer layer 162 and a pant liner 196 (see FIG. 4).

The pants 160 include zipper 170, integrated belt 172, fly 174, suspender attachment points 176, knee pads 178, front pockets 180, and cuff reinforcement 182.

Referring to FIG. 3, a view of the jacket lining of the non-treated structural firefighting gear is shown.

The jacket liner 192 is preferably attached to the jacket 120 by attachment snaps 194.

Referring to FIG. 4, a view of the pant lining of the non-treated structural firefighting gear is shown.

The pant liner 196 optionally includes a hook-and-loop fly 198 for closure.

Figure 5:
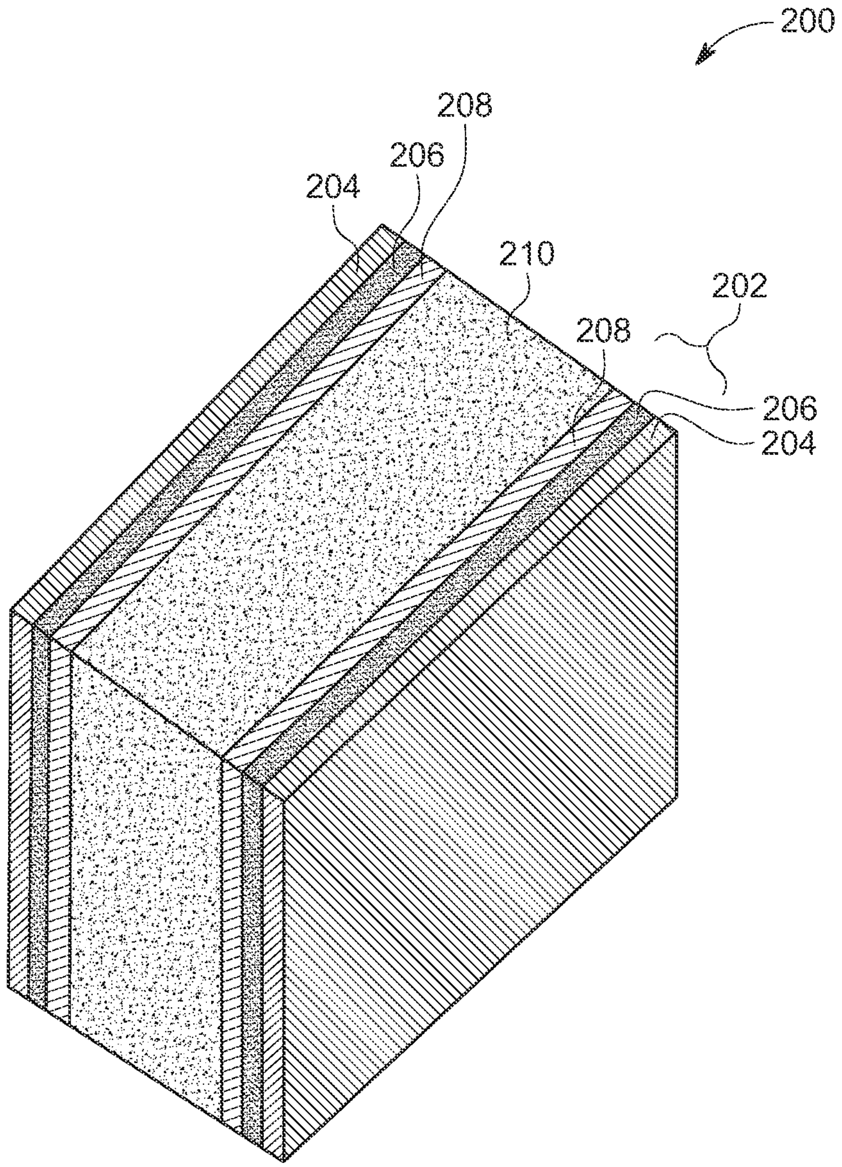
FIG. 5 illustrates a cross-section of a lining material of the non-treated structural firefighting gear.

Referring to FIG. 5, a cross-section of a lining material of the non-treated structural firefighting gear is shown.

The lining, or inner layer, 200 is formed from a shell, the shell 202 optionally constructed of multiple layers of polyester, including up to a first layer 204, second layer 206, and third layer 208.

Within the shells 202 is the fill 210, preferably of a cotton batting type material.

Equivalent elements can be substituted for the ones set forth above such that they perform in substantially the same manner in substantially the same way for achieving substantially the same result.

What is claimed is:

1. Untreated structural firefighting gear for use by firefighters during training, the untreated structural firefighting gear comprising:

a jacket;

the jacket constructed from cloth that has not been treated with chemicals to increase fire resistance;

a pair of pants;

the pair of pants constructed from cloth that has not been treated with chemicals to increase fire resistance;

a jacket liner;

the jacket liner formed from a shell that encapsulates a fill material;

the jacket liner forming a continuous insulating barrier between a user and the jacket, causing a user to retain body heat, putting the user at risk of overheating;

the jacket liner duplicating a weight, bulk, and insulating characteristics of a jacket liner of a treated structural firefighting gear;

a pants liner;

the pants liner formed from a shell that encapsulates a fill material;

the pants liner forming a continuous insulating barrier between the user and the pair of pants, causing a user to retain body heat, putting the user at risk of overheating;

the pants liner duplicating the weight, bulk, and insulating characteristics of a pants liner of the treated structural firefighting gear;

the jacket and the pair of pants having physical characteristics matching that of treated structural firefighting gear, therefore allowing firefighters to develop appropriate muscle groups and reflexes that would be created by training with treated structural firefighting gear, but without exposure to flame retardant chemicals.

2. The untreated structural firefighting gear of claim 1, wherein the shell of the jacket liner and pants liner are each formed from a first layer of material, a second layer of material, and a third layer of material.

3. The untreated structural firefighting gear of claim 2, wherein:

the first layer of material, the second layer of material, and the third layer of material are each formed from non-woven polyester fabric, the non-woven polyester fabric not treated with fire-retardant chemicals.

4. The untreated structural firefighting gear of claim 2, wherein the fill material is cotton, the cotton not treated with fire-retardant chemicals.

5. The untreated structural firefighting gear of claim 1, wherein an outer layer of the jacket is formed from 10-ounce cotton ripstop canvas, the 10-ounce cotton ripstop canvas not treated with fire-retardant chemicals.

6. Non-treated structural firefighting gear for use by a firefighter in non-hazardous scenarios, the non-treated structural firefighting gear comprising:

a jacket, the jacket constructed from a jacket outer layer forming a body and sleeves, and a jacket liner;

pants, the pants constructed from a pants outer layer forming two legs, and a pants liner;

the jacket liner and the pants liner constructed from a first shell and a second shell that enclose an inner layer of fill material;

the jacket liner forming a continuous insulating barrier between a user and the jacket, causing the user to retain body heat, putting the user at risk of overheating;

the jacket liner duplicating a weight, bulk, and insulating characteristics of a jacket liner of a treated structural firefighting gear;

the pants liner forming a continuous insulating barrier between the user and the pants, causing the user to retain body heat, putting the user at risk of overheating;

the pants liner duplicating the weight, bulk, and insulating characteristics of a pants liner of the treated structural firefighting gear;

wherein the non-treated structural firefighting gear mimics weight and motion limitations created by treated structural firefighting gear, therefore allowing the firefighter to develop a set of reflexes and responses that would be developed from practicing with treated structural firefighting gear.

7. The non-treated structural firefighting gear of claim 6, wherein the first shell and the second shell of the jacket liner is are each formed from a first layer of material, a second layer of material, and a third layer of material.

8. The non-treated structural firefighting gear of claim 6, wherein the first shell and the second shell of the pants liner is are each formed from a first layer of material, a second layer of material, and a third layer of material.

9. The non-treated structural firefighting gear of claim 8, wherein:

the first layer of material, the second layer of material, and the third layer of material are each formed from non-woven polyester fabric, the non-woven polyester fabric not treated with fire-retardant chemicals.

10. The non-treated structural firefighting gear of claim 6, wherein the fill material is cotton, the cotton not treated with fire-retardant chemicals.

11. The non-treated structural firefighting gear of claim 6, wherein the jacket outer layer is formed from 10-ounce cotton ripstop canvas, the 10-ounce cotton ripstop canvas not treated with fire-retardant chemicals.

12. The non-treated structural firefighting gear of claim 6, wherein the pants outer layer is formed from 10-ounce cotton ripstop canvas, the 10-ounce cotton ripstop canvas not treated with fire-retardant chemicals.

13. Non-treated structural firefighting gear for use by a firefighter in non-hazardous scenarios, the non-treated structural firefighting gear comprising:

a jacket, the jacket constructed from a jacket outer layer forming a body and sleeves, and a jacket liner;

the jacket outer layer is formed from 10-ounce cotton ripstop canvas, the 10-ounce cotton ripstop canvas not pretreated with fire-retardant chemicals;

pants, the pants constructed from a pants outer layer forming two legs, and a pants liner;

the jacket liner and the pants liner constructed from a first shell and a second shell that enclose an inner layer of fill material, the fill material being cotton, the cotton not pretreated with fire-retardant chemicals;

the first shell and the second shell each formed from a first layer of material, a second layer of material, and a third layer of material;

the first layer of material, the second layer of material, and the third layer of material are each formed from non-woven polyester fabric, the non-woven polyester fabric not pretreated with fire-retardant chemicals;

the jacket liner forming a continuous insulating barrier between a user and the jacket, causing the user to retain body heat, putting the user at risk of overheating;

the jacket liner duplicating a weight, bulk, and insulating characteristics of a jacket liner of a treated structural firefighting gear;

the pants liner forming a continuous insulating barrier between the user and the pants, causing the user to retain body heat, putting the user at risk of overheating;

the pants liner duplicating the weight, bulk, and insulating characteristics of a pants liner of the treated structural firefighting gear;

wherein the non-treated structural firefighting gear mimics weight and motion limitations created by treated structural firefighting gear, therefore allowing the firefighter to develop a set of reflexes and responses that would be developed from practicing with treated structural firefighting gear.

* * * * *